United States Patent [19]
Carter et al.

[11] Patent Number: 5,858,525
[45] Date of Patent: Jan. 12, 1999

[54] SYNTHETIC GASKET MATERIALS FOR USE IN HIGH-PRESSURE PRESSES

[75] Inventors: Lan Carter, Payson; Xian Yao, Orem; Ghanshyam Rai, Sandy, all of Utah

[73] Assignee: General Electric Company, Pittsfield, Mass.

[21] Appl. No.: 874,769

[22] Filed: Jun. 13, 1997

Related U.S. Application Data

[63] Continuation of Ser. No. 368,884, Jan. 5, 1995, abandoned.

[51] Int. Cl.$^6$ .............................. B32B 5/16; B22F 1/00; C22C 29/12
[52] U.S. Cl. ............................. 428/325; 75/228; 75/230; 75/232; 75/233; 75/328; 75/768; 75/773; 428/328; 428/329; 428/331; 428/332; 428/454; 428/688
[58] Field of Search .............................. 425/77, DIG. 26; 428/323, 325, 328, 329, 331, 332, 454, 688; 75/326, 328, 329, 228, 230, 232, 233, 235, 255, 252, 768, 773; 501/102, 105, 127, 128, 129, 130, 141, 107

[56] References Cited

U.S. PATENT DOCUMENTS

| | | | |
|---|---|---|---|
| 3,793,134 | 2/1974 | Hardy et al. | 161/162 |
| 3,914,078 | 10/1975 | Kendall | 425/77 |
| 4,005,180 | 1/1977 | Greenhalgh et al. | 423/446 |
| 4,140,448 | 2/1979 | Brinkeborn et al. | 425/77 |
| 4,529,663 | 7/1985 | Lancaster et al. | 428/450 |

FOREIGN PATENT DOCUMENTS

| | | |
|---|---|---|
| 275580 | 1/1990 | Germany . |
| 275581 | 1/1990 | Germany . |
| 283699 | 10/1990 | Germany . |
| 579327 | 7/1946 | United Kingdom . |
| 835027 | 5/1960 | United Kingdom . |
| 900700 | 7/1962 | United Kingdom . |
| 927921 | 6/1963 | United Kingdom . |
| 1181266 | 2/1970 | United Kingdom . |
| 1374493 | 11/1974 | United Kingdom . |
| 275579 | 1/1990 | United Kingdom . |

OTHER PUBLICATIONS

Japanese Patent Abstract, Publication No. JP5317682, Publication Date 1993.
Japanese Patent Abstract, Publication No. JP6114258, Publication Date 1994.

*Primary Examiner*—H. Thi Le

[57] ABSTRACT

A synthetic gasket material for use in a high-pressure press includes a major proportion of clay mineral powder having sufficient lubricity to flow in a high-pressure press, a minor proportion of at least one hard material powder having a sufficiently greater hardness than the clay mineral to retard flow of the clay mineral and form a seal during pressing in a high-pressure press, and a sufficient amount of binder to form an integral body. The synthetic gasket material is formed by thoroughly mixing together in desired proportions the clay mineral, hard material, and binder. The mixture is compacted into a body near net geometry and having a desired configuration to facilitate use in the high-pressure press. The compacted body is heated for a sufficient time and at a sufficient temperature to remove non-crystallographic water. A synthetic gasket material prepared according to principles of this invention displays improved flow, pressure transmitting, and thermal insulating properties when compared with gasket material made from natural pyrophyllite, due to the improved compositional consistency, i.e., lack of impurities and consistently low moisture content, of the synthetic gasket material.

10 Claims, 1 Drawing Sheet

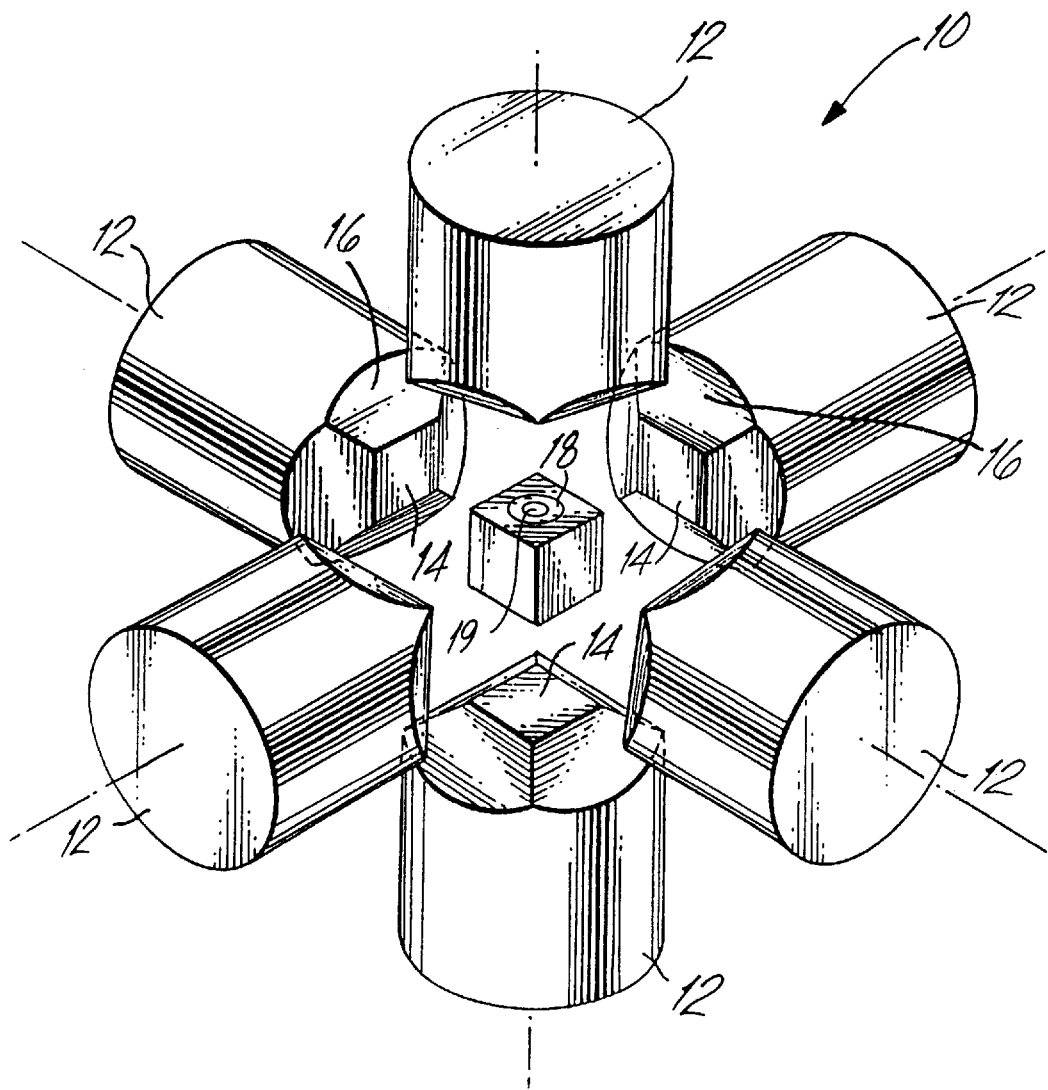

SYNTHETIC GASKET MATERIALS FOR USE IN HIGH-PRESSURE PRESSES

This is a continuation of of application Ser. No. 08/368,884 filed on Jan. 5, 1995, abandoned.

FIELD OF THE INVENTION

The present invention relates generally to sealing gaskets that are used with high-pressure presses and, more particularly, to sealing gaskets formed from synthetic materials that are used with high-pressure presses used to form diamond or polycrystalline diamond.

BACKGROUND OF THE INVENTION

Polycrystalline diamond composites are manufactured by a process of applying extreme pressure (e.g., 65 kilobars) to a quantity of diamond powder and the like disposed within a container, and heating the diamond under pressure to a sufficient temperature where diamond is thermodynamically stable. As used herein, high pressure press means a press capable of applying sufficient pressure for maintaining diamond thermodynamically stable. In one process the pressure is applied to the container by a number of anvils that are connected to a high-pressure press. The high-pressure press may have six anvils that are each positioned at 90 degree angles with respect to adjacent anvils and converge when the press is operated to surround the container in the shape of a cube, i.e., surround the container around six sides. A sealing gasket in the shape of a cube is interposed between the container and the anvils by placing the container within a bore of the gasket. The gasket acts to perfect a pressure seal between adjacent anvil edge portions, forming a sealed pressure chamber therebetween, and transmits the pressure force exerted by each anvil to the container.

The above-described polycrystalline diamond manufacturing process incorporates use of a sealing gasket machined from a block of pyrophyllite, a natural form of hydrous aluminum silicate found in metamorphic rocks. Pyrophyllite has been used as the preferred gasket material because of its physical properties of being able to both deform or flow under pressure, to a limited extent to perfect a pressure seal and transmit the pressure force from the anvils to the container. Pyrophyllite also displays good thermal insulating characteristics that help to reduce the amount of heat that is transferred by thermal conduction from the container to the anvils during sintering.

However, the use of a gasket formed from pyrophyllite introduces variation and inconsistency into the high-pressure process. Because pyrophyllite is a natural material and, therefore, has inconsistencies in its composition, the physical properties of a sealing gasket formed from pyrophyllite also display such inconsistencies. For example, variations in pyrophyllite composition and moisture content are well known. Such variations have an impact on the operation of the high-pressure press and the quality of the polycrystalline product being produced, as these variations affect the flow, pressure transmitting, and thermal insulating characteristics of the resulting gasket material formed from the pyrophyllite. Variations in composition and moisture content of gasket materials formed from pyrophyllite reduce product consistency, reduce product yield, and increase anvil breakage and/or press damage.

It is, therefore, desirable that a sealing gasket used with a high-pressure press be constructed from a material that does not display variations or inconsistencies in its composition. It is desired that the gasket be formed from a material that does not display variations or inconsistencies in its moisture content. It is desirable that the gasket be formed from a material that has consistent flow, pressure transmitting, and thermal insulating characteristics. It is desired that the gasket be formed from a material having flow, pressure transmitting, and thermal insulating characteristics that equal or surpass those of gaskets formed from pyrophyllite. It is also desired that the gasket be formed from conventional and readily available materials, and be formed using conventional manufacturing techniques.

SUMMARY OF THE INVENTION

There is, therefore, provided in practice of this invention a synthetic gasket material for use in a high-pressure press. The synthetic gasket material includes a major proportion of clay mineral powder having sufficient lubricity to flow in a high-pressure press, and a minor proportion of at least one hard material powder having a sufficiently greater hardness than the clay mineral to retard flow of the clay mineral and form a gasket seal during pressing in a high-pressure press. The synthetic gasket material also includes a sufficient amount of binder to form an integral body.

The synthetic gasket material is formed by thoroughly mixing together in desired proportions the clay mineral, hard material, and binder. The mixture is compacted into a cell or pressure gasket body near net geometry and having a desired shape to facilitate use in the high-pressure press. The compacted body is heated for a sufficient time and at a sufficient temperature to remove non-crystallographic water.

The synthetic gasket material prepared according to principles of this invention displays improved flow, pressure transmitting, and thermal insulating characteristics when compared with gasket material made from natural pyrophyllite, due to the improved compositional consistency, i.e., lack of impurities and consistently low moisture content, of the synthetic gasket material. In addition to these advantages, pressure sealing gaskets formed of this material are less costly than gaskets formed from pyrophyllite.

BRIEF DESCRIPTION OF THE DRAWINGS

These and other features and advantages of the present invention will become appreciated as the same becomes better understood with reference to the specification, claims and drawings wherein:

FIG. 1 is a perspective view of a cubic-shaped pressure sealing gasket made from a synthetic gasket material according to principles of this invention disposed within an apparatus suitable for operation at high pressures.

DETAILED DESCRIPTION

FIG. 1 illustrates a traditional cubic press 10 comprising six anvils 12 in three oppositely oriented matching pairs. Each anvil has a square face 14 and a sloping shoulder portion 16. The anvils, at least tow of which are electrically insulated from each other, are aligned for rectilinear movement along three mutually perpendicular coordinate axes and are synchronized in their motion by an anvil guide mechanism (not shown). Each anvil 12 is attached to and powered by a support apparatus (not shown) including a double acting hydraulic ram affixed to a base. The bases are fastened together by an arrangement of twelve tie rods forming the outline of a regular hexahedron. The thrust of the six rams simultaneously moves the synchronized anvils 12 toward the symmetry center of the press about a cubic-shaped cell 18 formed from a synthetic gasket material prepared in accordance with principles of this invention.

The cell 18 is configured having six square faces that are greater in area than the adjacent respective anvil faces. Advance of the anvils against the cell faces extrudes and compresses material from the cell between the sloping shoulder portions of the anvils, forming a pressure sealing gasket therebetween. The pressure transmitted by the anvils is transmitted to a sample (not shown), such as diamond particles and the like used in the formation of a polycrystalline diamond compact, undergoing sintering in a container (not shown) that is disposed in a hole or passage 19 extending through the cell. After a predetermined pressure has been transmitted by the anvils to the cell 18 and container, an electrical current is directed to the sample via one pair of matched anvils to activate an electrical resistance heating element within the passage 19. The heat generated by the heating element is transmitted by thermal conduction through the container to heat the sample disposed within the container. After a predetermined amount of time the temperature of the sample and pressure transmitted to the sample are reduced.

A particular embodiment of a conventional high-pressure press and pressing process has been specifically described above and illustrated for purposes of reference only and is not meant in any way to limit the application of the synthetic gasket material prepared according to principles of this invention. It is, therefore, to be understood that the synthetic gasket material can be used with other types of high-pressure presses such as with belt presses and the like. It is also to be understood that the synthetic gasket material can be used to form a cell or pressure gasket having a geometric configuration other than a square cube. For example, the cell can be configured in the shape of a rectangular solid, a tetrahedron, a cylinder or the like.

A synthetic cell or pressure gasket is made from synthetic materials for use with high-pressure presses is prepared according to principles of this invention by combining a major proportion of clay mineral powder, with a minor proportion of at least one hard material powder, with a sufficient amount of at least one binder.

A suitable clay mineral powder may be selected from the group consisting of akermanite ($Ca_2MgSi_2O_7$), betrandite ($Be_2Al_2Si_6O_{16}$), kaolinite (($Al_4Si_6)_{10}(OH)_8$), pyrophyllite ($Al_4Si_4O_{10}(OH)_2$) rehnite (($Ca_2Al_2Si_3O_{10}(OH)_2$) pyrope ($Mg_3Al_2Si_3O_{12}$), scolecite ($CaAl_2Si_2O_7$—$3H_2O$), serpentine ($Mg_3Si_2O_5(OH)_4$), high alumina talc, low alumina talc, zoisite ($Ca_2Al_3Si_3O_{12}(OH)_2$) and the like. It is desired that the clay mineral powder have an average particle size of less than about 325 U.S. mesh size. A preferred clay mineral powder has an average particle size in the range of from about 25 to 50 micrometers.

The clay mineral powder is used to provide characteristics of lubricity to the gasket material to allow the gasket material to flow under the pressure of a high-pressure press. A preferred embodiment of the synthetic gasket material may comprise in the range of from 60 to 90 percent by weight of the clay mineral. A synthetic gasket material comprising less than about 60 percent by weight of the clay mineral displays a reduced ability to flow under pressure that may reduce the gasket's ability to perfect a pressure seal and, thus form a closed pressure cell to effect omnidirectional pressure force transmission to a sample. A synthetic gasket material comprising greater than about 90 percent by weight of the clay mineral displays an enhanced ability to flow under pressure that may also reduce the gasket's ability to perfect a pressure seal and form a closed pressure cell. A preferred clay material is high alumina talc.

It is desired that the hard material powder have a sufficiently greater hardness than the clay mineral to retard flow of the clay mineral during pressing in a high-pressure press. In effect, particles of hard material in the clay mineral increases the viscosity or internal friction of the mineral as it flows under high pressure. It is desired that the hard material powder be formed from a material having a sufficient hardness such that the material does not itself plastically deform in the hydrostatic clay mineral at the pressures typical of the high-pressure press.

Suitable hard material powders include silica ($SiO_2$), alumina ($Al_2O_3$), iron oxide ($Fe_3O_4$), zircon ($ZrSiO_4$) and the like. It is desired that the hard material powder have an average particle size of less than 325 U.S. mesh size. A preferred hard material powder has an average particle size in the range of from about 25 to 50 micrometers. A preferred synthetic gasket material may comprise in the range of from 5 to 35 percent by weight of the hard material powder. A synthetic gasket material comprising greater than 35 percent by weight of the hard material powder may form a pressure gasket having a reduced flow capacity that may impair the gasket's ability to form a pressure seal and, thus form a closed pressure cell. A preferred hard material powder is zircon. A preferred combination of hard material powders includes silica and zircon. For example, a synthetic gasket material may comprise in the range of from 5 to 15 percent by weight silica and from 0 to 15 percent by weight zircon.

Suitable binders may be solids or liquids selected from the group of materials including sodium silicate, acrylic copolymers, arabic gum, portland cement and the like. The binder is used to bind together the clay mineral and hard material particles to form a homogeneous integral body. Inorganic binders are preferred because they do not produce an out gas during the high-pressure process, whereas some organic binders burn and volatize at temperatures of approximately 1300° C. The synthetic gasket material comprises a sufficient amount of binder to form an integral body from the clay and hard material particles. A preferred synthetic gasket material may comprise in the range of from about 5 to 15 percent by weight binder. It is desired that the amount of inorganic binder that is used form a cell or integral gasket body having a density of at least 85 percent of theoretical density. It is to be understood that exact proportion of binder used will vary depending on the proportion of the clay mineral and hard material that are used to prepare the synthetic gasket material.

A preferred binder material is sodium silicate in the form of a type "N" aqueous sodium silica solution comprising approximately 37 percent by weight solids provided by the PQ Corporation of Valley Forge, Pa. A preferred synthetic gasket material comprises approximately eight percent by weight of the aqueous sodium silicate solution. Sodium silicate is preferred because it is known to produce the most homogeneous synthetic gasket composition. Sodium silicate may form a more homogeneous mixture because of its ability to better wet the clay mineral and hard material.

It is desired that the particle size of the materials used in preparing the synthetic gasket material have a particle size of up to 325 U.S. mesh size to ensure that the cell or pressure gasket formed from such materials display desired and consistent flow properties. The use of particles having a size greater than about 325 U.S. mesh size tend to agglomerate during high pressure pressing, thereby interfering with consistent gasket flow.

It is desired that a cell or pressure gasket body formed from the cured synthetic material have a density in the range of from about 2.2 to 2.4 grams/cubic centimeter, i.e., in the range of from about 85 to 90 percent of theoretical density. A gasket body having such density is desired because a cell formed having such density demonstrates a desired degree of spring back that follows the high-pressure press anvils after the pressure has been released. A cured gasket body having greater than about 90 percent of theoretical density will produce a "decompression pop," which refers to the loss of pressure gasket seal that results when the press is decompressing from operating pressures, e.g., at the rate of 80 kilobars to room pressure in about 40 seconds.

Decompression pop is caused by the sudden expansion of the gasket body due to the gasket body having a high density. High gasket body density is believed to be caused by a reduced amount of voids within gasket body. These voids help to buffer or prevent the rapid expansion effect of gasket body. Decompression pop is not desired because it results in the rapid, rather than gradual, loss of the pressure gasket seal, and because it can cause damage to the anvils. Decompression pop can be eliminated or reduced by using zircon as the hard material for forming the synthetic gasket material. Zircon is beneficial in this respect because it is believed that zircon helps to create voids in the gasket body. Gasket bodies formed by using silica and iron oxide as the hard material have shown a tendency to decompression pop. Gasket bodies formed by using alumina as the hard material have shown a reduced ability to stay as a green cube and, therefore, can not be stored before curing for a length of time without the cube departing from its net dimension.

A gasket body formed from a synthetic gasket material having a density within the range of from 85 to 90 percent of theoretical density produces a pressure gasket seal between adjacent anvil shoulders that does not pop and is crumbly after the press is decompressed from operating pressures, thereby facilitating gradual decompression high-pressure press and eliminating the possibility of anvil damage.

Synthetic gasket materials prepared according to principles of this invention are configured in the shape of a cube for use in forming a pressure transmitting cell to facilitate use in the high-pressure press described above and illustrated in FIG. 1. In one specific application, the cubes have an edge dimension of approximately 1.4 inch, and were bored and counterbored and drilled for thermocouple holes. Examples 1–3 (described below) disclose the methods that were used to prepare such cubes from synthetic gasket materials of different compositions.

EXAMPLE NO. 1

A first embodiment of a cube formed from a synthetic gasket material of this invention was prepared by mixing together talc (clay mineral), silica (hard material), and sodium silicate (binder) to form a homogeneous synthetic gasket composition comprising approximately 83 percent by weight talc, 9 percent by weight silica, and 8 percent by weight sodium silicate. The ingredients were mixed together by using conventional blending techniques such as by using a V-blender or spray drier until a homogenous mixture, i.e., a slurry mix, was obtained. The synthetic gasket composition was pressed or compacted by conventional means to form an integral gasket body in the net shape of a cube. A minimum compaction pressure of approximately 20,000 psi was used to form a 1.4 inch edge length cube. During the pressing step a passage was pressed into the cube to accommodate placement of the container therein before placement into the high-pressure press, thereby eliminating the need to machine a passage into the cube after curing. The passage that was formed was undersized and was reamed to the desired diameter after the cube had been cured.

The cube was cured by heating at a temperature of approximately 200° C. (400° F.) for six hours to remove non-crystallographic water. After the curing step, the density of the cube was approximately 2.3 grams/cubic centimeter, i.e., approximately 90 percent of theoretical density, and the cube had a moisture content of between four to five percent. A counterbore was machined into the cube and holes were drilled in the cube to accommodate placement of a thermocouple therein.

EXAMPLE NO. 2

A second embodiment of a cube formed from a synthetic gasket material of this invention was prepared by mixing together talc (clay mineral), silica (hard material), zircon (hard material), and sodium silicate (binder) to form a homogeneous synthetic gasket composition comprising approximately 69 percent by weight talc, 14 percent by weight silica, 9 percent by weight zircon, and 8 percent by weight sodium silicate. The mixture was blended together, compacted, and cured in that same manner as that described for Example No. 1 to form a cubic-shaped gasket body having the same physical properties of density and moisture content as described for the cube of Example No. 1.

EXAMPLE NO. 3

A third embodiment of a cube formed from a synthetic gasket material of this invention was prepared by mixing together talc (clay mineral), silica (hard material), zircon (hard material), and sodium silicate (binder) to form a homogeneous synthetic gasket composition comprising approximately 69 percent by weight talc, 9 percent by weight silica, 14 percent by weight zircon, and 8 percent by weight sodium silicate. The mixture was blended together, compacted, and cured in that same manner as that described for Example No. 1 to form a cubic-shaped gasket body having the same physical properties of density and moisture content as described for the cube of Example No. 1.

A high-pressure sealing gasket made from synthetic materials, in accordance with principles of this invention, is desirable because the composition, impurity level, and moisture content can be specifically controlled by selecting the particular ingredients and proportion of such ingredients that are used to make the gasket material. The ability to hand pick or select only those ingredients, and tailor the proportions of such ingredients, that will produce consistently desirable physical characteristics eliminates variations in flow, pressure transmitting, and thermal insulating characteristics inherent in sealing gasket materials formed from natural pyrophyllite. Eliminating such variation allows for increased product yield, and decreased occurrences of anvil breakage and/or press damage.

Products such as diamond and polycrystalline diamond that are formed by use of pressure sealing gasket comprising synthetic gasket materials of this invention display a greater consistency in physical characteristics than those made by use of pressure sealing gaskets formed from pyrophyllite, because of the compositional consistency of the synthetic gasket material. This compositional consistency promotes consistent gasket flow characteristics under pressure, which in turn promotes consistent closed pressure cell formation and pressure transmission to the material disposed within the cell that is used to form the products. The compositional consistency inherent in the use of the synthetic gasket material also permits consistent operation of the high-pressure, thereby, eliminating the need to make adjustments in press operation and increasing product yield. Use of a synthetic gasket material having a consistent density (within the range of from about 85 to 90 percent of theoretical density) also reduces the occurrence of anvil breakage due to decompression pop during decompression operation of the high-pressure press.

Additionally, the use of a pressure sealing gasket formed from synthetic gasket materials according to principles of this invention increases the thermal efficiency of the press during the sintering operation, because the synthetic gasket material is a better insulator than the gasket formed from natural pyrophyllite. The synthetic gasket material is believed to be a better insulator than the pressure sealing gasket made from natural pyrophyllite because the thermal conductivity of talc, the major ingredient, is over 50 percent lower than pyrophyllite. Accordingly, a smaller amount of the thermal energy generated by the heating coil within the gasket adjacent the carrier is transmitted by the gasket material via thermal conduction to the anvil shoulder portions. Reducing the amount of thermal energy transmitted to the anvils increases amount of thermal energy directed to the sample for sintering, thereby enhancing the thermal efficiency of the sintering operation. The use of the synthetic gasket material also results in a more uniform power level required to sinter the sample, due to greater material and moisture content consistency than that of pressure sealing gaskets formed from natural pyrophyllite.

Additionally, the use of pressure sealing gaskets formed from synthetic gasket materials of this invention reduces the cost associated with forming the pressure gasket due to the reduced amount of machining that is required. A pressure cube formed from synthetic gasket material is pressed into form and the passage is also formed during the pressing operation. In contrast, a pressure cube formed from pyrophyllite is typically machined into the form of cube and the passage is also formed by a machining process.

Although limited embodiments of the synthetic gasket material have been described herein, many modifications and variations will be apparent to those skilled in the art. Accordingly, it is to be understood that, within the scope of the appended claims, the synthetic gasket material prepared according to principles of invention may be embodied other than as specifically described herein.

What is claimed is:

1. A synthetic gasket for high-pressure pressing in a high pressure cubic press comprising a cube formed of:

a major proportion of clay mineral powder having sufficient lubricity to flow between the anvils of a high-pressure cubic press;

a minor proportion of zircon powder; and a sufficient amount of binder to form an integral body that will form a seal between the anvils of a high pressure cubic press during pressing in such a high-pressure cubic press.

2. A synthetic gasket as recited in claim 1 wherein the clay mineral powder has a particle size in the range of from 25 to 50 micrometers.

3. A synthetic gasket as recited in claim 1 wherein the hard material powder has a particle size in the range of from 25 to 50 micrometers.

4. A synthetic gasket as recited in claim 1 comprising clay mineral powder in the range of from 60 to 90 percent by weight of the total synthetic gasket.

5. A synthetic gasket as recited in claim 1 comprising zircon powder in the range of from 5 to 35 percent by weight of the total synthetic gasket.

6. A synthetic gasket as recited in claim 1 comprising binder in the range of from 5 to 15 percent by weight of the total synthetic gasket.

7. A synthetic gasket as recited in claim 1 comprising in the range of from 60 to 90 percent by weight clay mineral powder, in the range of from 5 to 35 percent by weight zircon powder, and in the range of from 5 to 15 percent by weight binder.

8. A synthetic gasket for use in a high-pressure cubic press comprising a cube formed of:

a clay mineral powder in the range of from 60 to 90 percent by weight, wherein the clay material is selected from the group consisting of akermanite, betrandite, kaolinite, pyrophyllite, rehnite, pyrope, scolecite, serpentine, talc and zoisite;

zircon powder in the range of from 5 to 35 percent by weight for increasing the viscosity of the clay mineral during high-pressure flow between the anvils of a cubic press; and sufficient binder to form an integral body having a density in the range of 85 to 90 percent of theoretical density.

9. A synthetic gasket as recited in claim 8 wherein the clay material is talc powder.

10. A synthetic gasket as recited in claim 8 wherein the clay mineral powder and zircon powder have an average particle size in the range of from 25 to 50 micrometers.

* * * * *